United States Patent [19]

Wilson

[11] Patent Number: 5,646,500
[45] Date of Patent: Jul. 8, 1997

[54] INDUCTIVELY COUPLED CHARGER HAVING A LIGHT-ACTIVATED MECHANICAL POSITIONING SYSTEM

[75] Inventor: David T. Wilson, Torrance, Calif.

[73] Assignee: Delco Electronics Corp., Kokomo, Ind.

[21] Appl. No.: 379,234

[22] Filed: Jan. 27, 1995

[51] Int. Cl.$^6$ .................................................. H01M 10/46
[52] U.S. Cl. .................................................. 320/2; 439/246
[58] Field of Search .......................... 320/2, 5; 439/246, 439/247, 248, 249, 378

[56] References Cited

U.S. PATENT DOCUMENTS

| | | | |
|---|---|---|---|
| 5,252,078 | 10/1993 | Langenbahn | 320/2 X |
| 5,272,431 | 12/1993 | Nee | 320/2 |
| 5,306,999 | 4/1994 | Hoffman | 320/2 |
| 5,341,083 | 8/1994 | Klontz et al. | 320/2 |
| 5,461,298 | 10/1995 | Lara et al. | 320/2 |
| 5,462,439 | 10/1995 | Keith | 320/2 X |
| 5,498,948 | 3/1996 | Bruni et al. | 320/2 |
| 5,523,666 | 6/1996 | Hoelzl et al. | 320/2 |

*Primary Examiner*—Edward Tso
*Attorney, Agent, or Firm*—Mary S. Moore

[57] ABSTRACT

An inductive charging system having a light-activated mechanical positioning system for aligning a charge probe to a charge port in an electric vehicle to charge propulsion batteries of the electric vehicle. The present invention permits automatic docking of the electric vehicle to the charging system without operator assistance or intervention. A light detector, such as an an array of photoelectric detectors is disposed adjacent the charge probe. A light source is disposed on the electric vehicle that is aligned with the charge port. The detector or array of photoelectric detectors is coupled to a servo control system that includes an X-Y-Z mechanical driver that moves the position of the charge probe relative to the position of the charge port. The servo control system moves the position of the charge probe relative to the position of the charge port in the X, Y, or Z directions, based upon signals provided by the detector or array of photoelectric detectors. Once proper alignment of the charge probe to the charge port is achieved, the charge probe is fully inserted into the charge port and charging of the vehicle propulsion batteries commences. The present invention thus provides for a charging system that automatically and properly aligns the charge probe to the charge port of the electric vehicle without an operator physically handling the charge probe. Elimination of handling of the charge probe by the vehicle operator minimizes potential damage to the charging system and ensures the safety of the operator.

2 Claims, 1 Drawing Sheet

INDUCTIVELY COUPLED CHARGER HAVING A LIGHT-ACTIVATED MECHANICAL POSITIONING SYSTEM

BACKGROUND

The present invention relates generally to inductively coupled charging systems, and more particularly, to an inductive charging system having a light-activated mechanical positioning system for aligning a charge probe to a charge port disposed in an electric vehicle.

Inductive charging systems manufactured by the assignee of the present invention are employed to charge propulsion batteries of electric vehicles, for example. In one embodiment of the inductive charging system, for example, the inductive charging system includes a charge port disposed in an electric vehicle and a charge probe that is part of a charging station. The charge probe includes a primary core and a primary winding while the charge port includes a secondary core and a secondary winding. The primary winding of the charge probe is coupled to a source of power that is part of the charging station while the secondary winding of the charge port is coupled to the propulsion batteries of the electric vehicle.

In one version of this embodiment, an operator of the electric vehicle physically inserts the charge probe into the charge port in the electrical vehicle, in a manner similar to filling a conventional vehicle with gasoline. However, the charge probe carries many amperes of current and the probe must be properly inserted into the charge port to insure proper charging. To minimize concerns about user safety when handling the charge probe it is desirable to have a charging mechanism that does not require a user to physically hold the charge probe in order to charge the propulsion batteries of the electric vehicle.

Therefore, it is an objective of the present invention to provide an inductive charging system having a mechanical positioning system for aligning a charge probe to a charge port of an inductive charger.

SUMMARY OF THE INVENTION

In order to meet the above and other objectives, the present invention is an inductive charging system having a light-activated mechanical positioning system for aligning a charge probe to a charge port in an electric vehicle. The present invention permits automatic docking of the electric vehicle to the charging system. It is necessary for the driver of the electric vehicle to drive the vehicle proximal to the charging system in a predefined area. A light detector that typically comprises a grid or array of photoelectric detectors is disposed on the charging system. A light source is disposed on the electric vehicle that is aligned with the charge port. The detector or array of photoelectric detectors are coupled to a servo control system that includes an X-Y-Z mechanical driver, that moves the position of the charge probe relative to the position of the charge port once the electric vehicle has stopped adjacent the charging system. Once the electric vehicle is stopped, the servo control system moves the position of the charge probe relative to the position of the charge port in the X, Y, or Z directions, based upon the signals provided by the detector or array of photoelectric detectors. Once proper alignment of the charge probe to the charge port is determined, the charge probe is inserted into the charge port and charging of the vehicle propulsion batteries commences.

The present invention thus provides for a charging system that automatically and properly aligns the charge probe to the charge port of an electric vehicle without the operator physically handling the charging device. Elimination of handling of the charge probe by the vehicle operator minimizes potential damage to the charging system and ensures the safety of the operator.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which.

DETAILED DESCRIPTION

Figure 1:
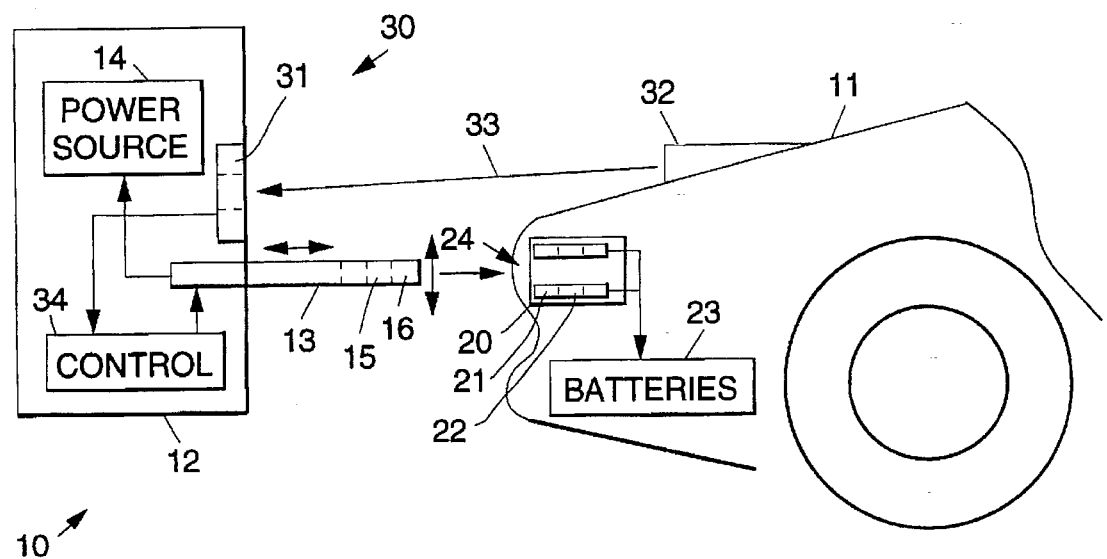
FIG. 1 is a partially cutaway side view an inductive charging system in accordance with the principles of the present invention that comprises a mechanical positioning system for aligning a charge probe to a charge port in an electric vehicle.

Referring to the FIG. 1, it is a partially cutaway side view an inductive charging system 10 in accordance with the principles of the present invention. The inductive charging system 10 comprises a mechanical positioning system 30 for aligning a charge probe 13 to a charge port 20 in an electric vehicle 11. The inductive charging system 10 comprises a charge station 12 that includes the charge probe 13 comprising a primary core 15 and a primary winding 16. The primary winding 16 is coupled to a power source 14 from which power is derived to charge propulsion batteries 23 in the electric vehicle 11.

The electric vehicle 11 houses the charge port 20 that comprises a secondary core 21 and secondary winding 22. The charge port 20 is typically formed with a opening 24 into which the charge probe 13 is inserted to form a fully functional transformer that couples electric power from the power source 14 to the propulsion batteries 23. The secondary winding 22 is coupled to the propulsion batteries 23 of the electric vehicle. The charge probe 15 is typically mounted at the front of the electric vehicle 11.

The mechanical positioning system 30 comprises a light detector 31, such as a grid or array of photoelectric detectors 31, disposed adjacent a front surface of the charging station 12. The detector 31, and in particular, the array of photoelectric detectors 31 may be a model A2V16 array, manufactured by United Detector Technology, for example. A light source 32 is disposed on the electric vehicle that is aligned with the charge port 20. The light source 32 may be collimated light source, such as a model 52442 laser, manufactured by Metrologic, for example. The light source 32 provides an output beam 33 that is directed toward the array of photoelectric detectors 31. The array of photoelectric detectors 31 are coupled to a servo control system 34 that includes an X-Y-Z mechanical driver 35, that moves the position of the charge probe 13 relative to the position of the charge port 20 once the electric vehicle 11 has stopped adjacent the charging station 12.

Figure 2:
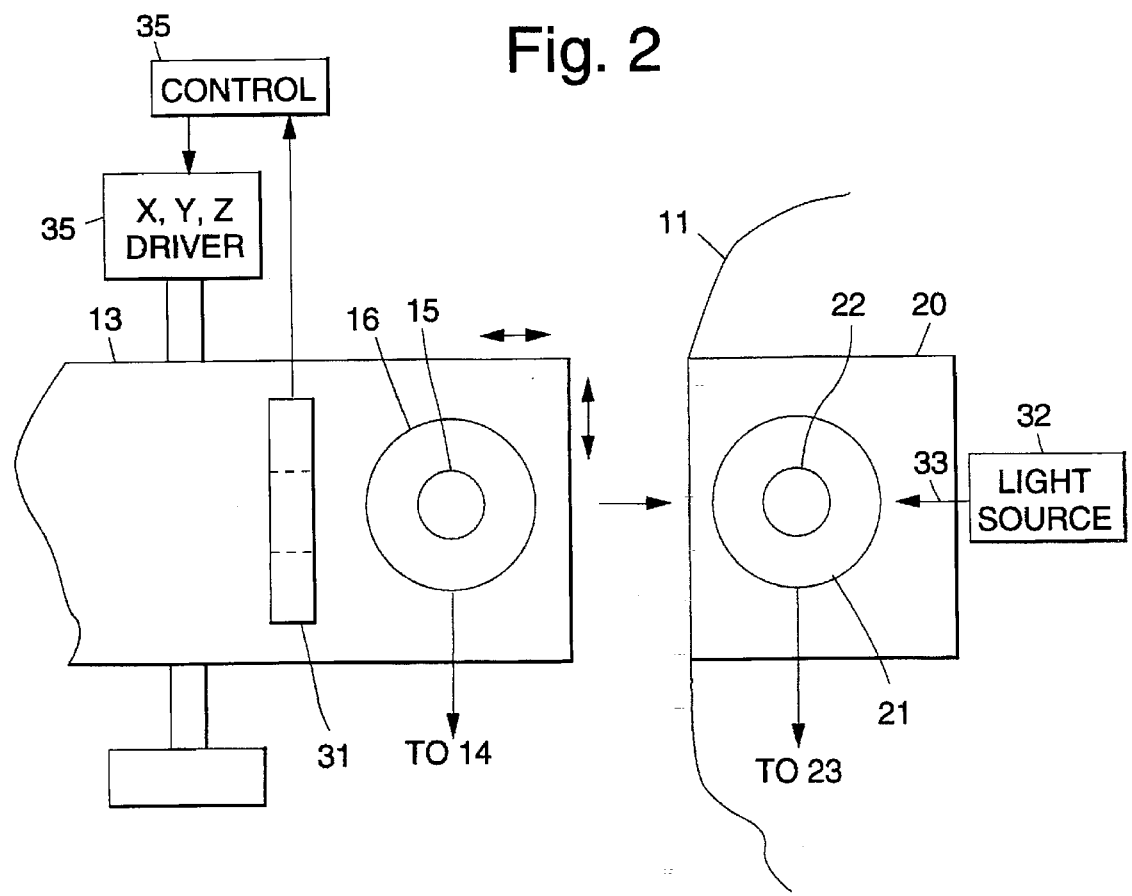
FIG. 2 is a partially cutaway top view of the inductive charging system of FIG. 1.

The servo control system 34 and X-Y-Z mechanical driver 35 may be a model System 5, manufactured by Eating Electrooptics, for example. Once the electric vehicle 11 is stopped, the servo control system 34 moves the position of the charge probe 13 relative to the position of the charge port 20 in the X, Y, or Z directions, illustrated by the double-headed arrows in FIGS. 1 and 2, based upon the signals provided by the array of photoelectric detectors 31. Once proper alignment of the charge probe 13 to the charge port 20 is determined, the charge probe 13 is fully inserted into the charge port 20 and charging of the vehicle propulsion batteries 23 commences.

Thus there has been described a new and improved inductive charging system having a mechanical positioning system for aligning a charge probe to a charge port of an inductive charger. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. An inductive charging system for charging propulsion batteries disposed in an electric vehicle, said system comprising:

vehicle mounted apparatus, including a charge port having a secondary core, a secondary winding that is coupled to the propulsion batteries and a light source that is aligned with the charge port; and a charge station disposed remote from the electric vehicle including a power source, a charge probe having a primary core and a primary winding disposed adjacent to the primary core coupled to the power source, a light detector and a servo control system coupled to the light detector having X-Y-Z positioning means for moving the position of the charge probe relative to the position of the charge port in X, Y, and Z directions in response to signals provided by the light detector so as to couple the charge probe and the charge port.

2. The inductive charging system of claim 1 wherein the light detector comprises an array of photoelectric detectors.

\* \* \* \* \*